July 8, 1941.  E. O. SETTERBLADE  2,248,789
CONTROLLABLE PITCH PROPELLER
Filed Oct. 18, 1938
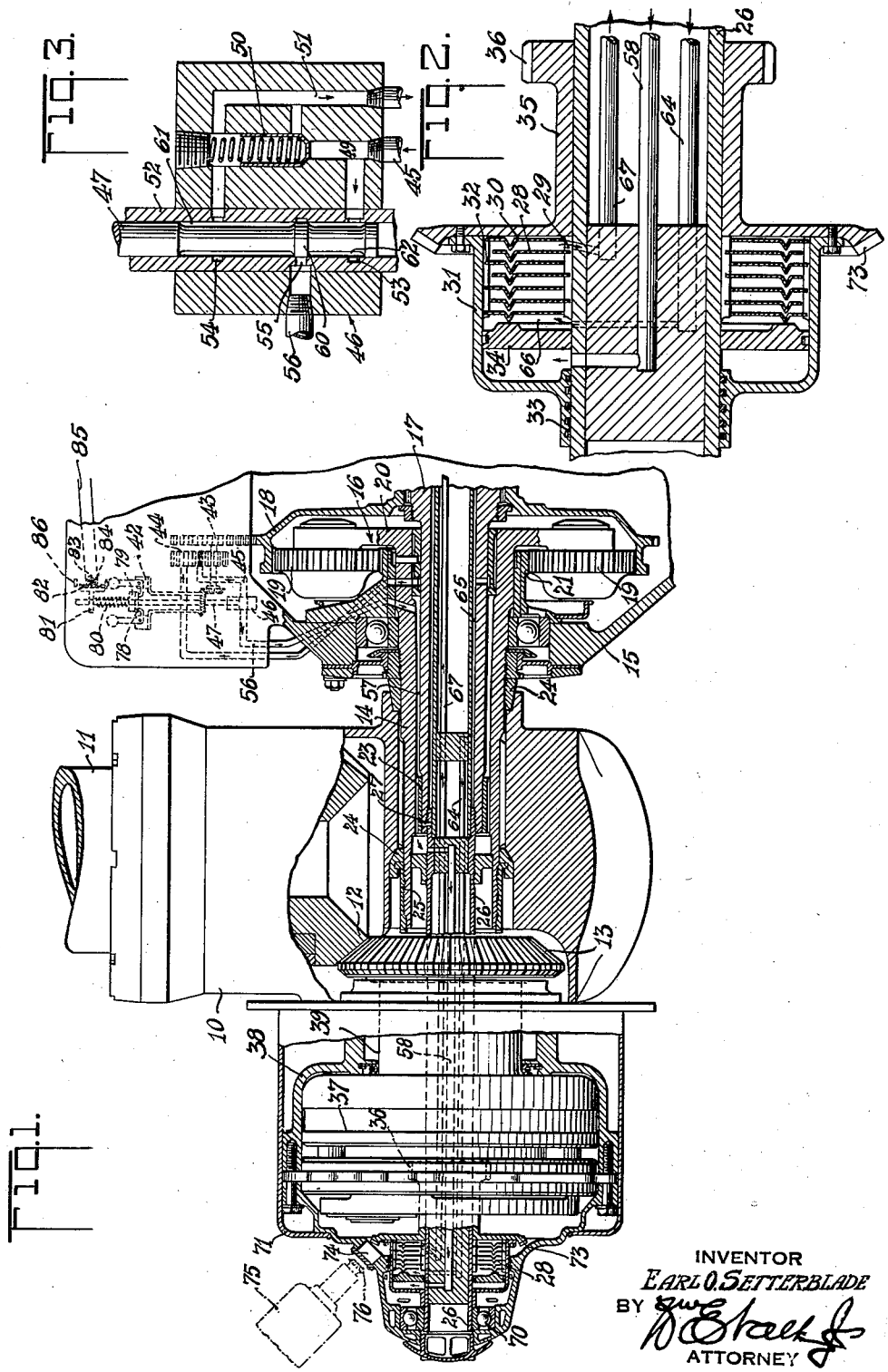
INVENTOR
EARL O. SETTERBLADE
BY
ATTORNEY Patented July 8, 1941

2,248,789

UNITED STATES PATENT OFFICE 2,248,789

CONTROLLABLE PITCH PROPELLER

Earl Oliver Setterblade, Paterson, N. J., assignor to Wright Aeronautical Corporation, a corporation of New York Application October 18, 1938, Serial No. 235,550

8 Claims. (Cl. 170—135.6)

This invention concerns controllable pitch propellers and relates particularly to improvements and means for effecting blade pitch changes therein.

An object of the invention is to provide mechanism by which power for changing the pitch of controllable propeller blades is secured from the differential rotation of the propeller shaft and crankshaft of an engine. A further object of the invention is to provide a mechanically operated controllable pitch propeller along with mechanical means for governing propeller blade pitch to attain constant speed propeller operation. Still another object is to provide mechanism for controllably and continuously urging the pitch of the propeller blades toward one extreme of adjustment in opposition to dynamic propeller forces tending to urge the blades to an opposite extreme pitch position. A further object is to provide, in a propeller pitch changing mechanism, a slipping clutch whose driving effort is governed in response to blade pitch requirements, and which clutch is provided with cooling means to effectively prevent overheating. Further objects will become apparent in reading the annexed detail description in connection with the drawing, in which:

Fig. 1 is a longitudinal section through a propeller hub, power plant nose, and pitch control mechanism;

Fig. 2 is an enlarged longitudinal section through the slipping clutch, and

Fig. 3 is an enlarged section through a control valve mechanism.

In Fig. 1 is shown a propeller hub 10 provided with blades 11 journalled therein for pitch change, the hub as shown being equipped for three blades. At the butt of each blade 11 is a bevel gear 12 meshing with a master bevel gear 13 concentric with a propeller shaft 14 extending forwardly from an engine crankcase nose 15. The shaft 14 is part of the conventional reduction gear organization 16 of the engine, the shaft 14 being driven by an engine crankshaft 17 through the planetary reduction gear comprising a ring gear 18 secured to the crankshaft 17 meshing with pinions 19 journalled on a spider 20 rigid with the propeller shaft 14, the pinions 19 reacting against a sun gear 21 secured to the crankcase 15. In an organization of this type, the chankshaft 17 rotates at a speed considerably greater than that of the propeller shaft 14 and, it will be noted, the crankshaft 17 extends through a portion of the propeller shaft and is piloted with respect thereto at a bushing 23.

The hub 10 is mounted on the propeller shaft 14 at taper bushings 24 and is secured thereto by a nut 25. A hollow shaft 26 is secured to the crankshaft 17 at 27 and extends forwardly to receive clutch plates 28 splined thereto as at 29. Alternate clutch plates 30 between the clutch plates 28, are splined to a drum 31 as at 32, the drum being piloted upon the shaft 26 at 33. Said drum comprises a cylinder within which is disposed a floating piston 34 engageable with the end clutch plate 30, the piston being movable to engage the clutch plates with one another to effect a positive or slipping drive from the shaft 26 to the drum 31, said drum being secured to a concentric hollow shaft 35 carrying a pinion 36 at its inboard end. Said pinion forms the driving element for a speed reducer 37 which may be any suitable form of epicyclic gear train, well-known in the art. The housing of the train 37 is secured through a member 38 to the front of the propeller hub 10, and the power output element of the speed reducer comprises a shaft 39 carrying the bevel gear 13 which engages the propeller blade gears 12.

Now it will be seen that when the clutch 28, 30 is disengaged, there will be no driving effort transmitted to the blades for pitch changing rotation thereof, but when the clutch 28, 30 is engaged, driving effort, due to the differential speed between the crankshaft 17 and the propeller shaft 14, will be transmitted through the speed reducer to effect pitch changing rotation of the propeller blades.

In the normal type of propeller, centrifugal force on the blades produces a force tending to turn the blades to a flat pitch position, this force being of considerable magnitude and being sufficient to flatten the pitch of the blades if they are not held against flattening by an irreversible pitch changing mechanism. Since the speed reducer 37 is an epicyclic train, it is reversible and, if the clutch 28, 30 is disengaged, propeller pitch will gradually flatten in operation. When the clutch 28, 30 is fully engaged, power resulting from differential rotation of the propeller and crankshafts will serve to move the blades to a pitch increasing position. If the clutch 28, 30 be partially engaged, so that it slips but transmits a torque equivalent to the counter-torque exerted by the blades, the propeller blades will be held at a constant pitch.

It is contemplated herein that the engagement of the clutch 28, 30 be effected by hydraulic pressure and that the hydraulic pressure be adjusted in response to engine speed by which pitch adjustment of the propeller blades may hold the engine at constant speed. The control mechanism necessary comprises a flyweight governor 42 suitably driven by a gear 43 from the engine mechanism, the gear 43 also serving to drive a governor fluid pump 44, output from which passes through a passage 45 to a control valve 46 including a spindle 47 operated by the governor 42. Details of the valve organization 46 are shown in Fig. 3 in which the passage 45 communicates with a drilling 49 having a pressure relief valve 50 leading to an outlet line drilling 51. A valve barrel 52 is provided with axially spaced ports 53 and 54 respectively communicating with the drillings 49 and 51, the barrel 52 likewise being provided with a port 55 communicating with a line 56 which leads, as shown in Fig. 1, to a passage 57 between the propeller shaft and crankshaft and thence through a pipe 58 to the drum 31. The valve spindle 47 which is axially movable by the governor 42, carries a band 60 bordered by recessed portions 61 and 62, the band 60 serving as a valve to admit or cut off hydraulic fluid with respect to the line 56. If the engine is under speed, the band 60 will lower and permit outflow of hydraulic fluid from the line 56, through the port 55 to the outlet passage 51, such pressure relief opening the clutch 28, 30, and permitting the dynamic forces in the propeller blades to reduce pitch with consequent increase in engine speed. If engine speed be too great, the valve stem 47 will raise admitting pressure fluid from the drilling 49 to the line 56 and to the clutch 28, 30, serving to engage the clutch and effect pitch increase in the propeller blades, thus increasing the load on the engine and reducing its speed. In operation, the valve stem 47 will float to an equilibrium position whereat constant engine speed is maintained, the pressure admitted to the clutch 28, 30 being sufficient to hold same in slipping engagement.

It is contemplated that the power loss in the clutch to maintain relatively constant engine speed conditions will be of the order of one to three horsepower. However, it is necessary that the heat generated by this power loss must be dissipated and for this purpose the clutch 28, 30 is oil cooled by means of an inlet line 64, shown in Figs. 1 and 2, leading from the normal engine oil carrying passage 65 in the crankshaft, to one end of the clutch plates as at 66, this oil flowing over the clutch and abstracting heat therefrom and returning through a line 67 to discharge at any suitable location within the engine.

Fig. 1 shows a pilot bearing 70 at the extreme nose of the propeller which serves to pilot the extension shaft 26 with respect to a housing 71 embracing the clutch and speed reducer.

It will be appreciated that propeller pitch control according to this invention is dynamic—that is, no power pitch change may be effected except when the engine is running and when fluid pressure is available. Thus some means may be necessary to afford propeller pitch adjustment prior to take-off of an airplane or prior to engine starting. To this end, a bevel gear 73 is formed integral with the shaft 35 adjacent the clutch 28, 30 and a port 74 is formed in the housing 71 so that a separate motor device 75 having a bevel gear 76 may be meshed with the gear 73 and operated to change the initial setting of propeller pitch either for pitch increase or decrease as desired.

The particular embodiment of the invention selected for illustration shows a hydraulic type of constant speed control but it is deemed to be within the scope of the invention to include any other suitable type of control mechanism such as solenoid operation or pure mechanical operation. Likewise, a positive brake might be added to the system to relieve the clutch 28, 30 of constant power transmission during propeller operation, this brake being coordinated with the governor control to make the speed reducer 37 irreversible when equilibrium conditions of engine operation exist. It is likewise deemed within the scope of the invention to utilize the differential rotation of the propeller shaft and crankshaft to effect positive drive for either pitch increase or pitch decrease, and to provide limit stops beyond which blade pitch changes may not be made.

It is appreciated that the prior art shows controllable pitch propellers in which the speed difference between the propeller shaft and the engine crankcase is utilized to provide power for blade pitch change but in such organizations the clutching and pitch changing mechanism must be between the propeller and crankcase and involves rather cumbersome structure in that location. By the present invention, the propeller and pitch control device therefor are unitary and may be readily detached from the engine for service or repair, and it will be noted that all of the pitch changing apparatus is disposed forward of the propeller hub where there is ample space therefor and whereby the propeller may be disposed in close proximity to the engine nose to the elimination of unnecessary flexibility between the propeller hub and the engine structure.

Again referring to the drawing, means are provided to adjust the governor for any desired speed setting, this adjustment also being usable to feather the propeller when desirable. The valve stem 47 carries a disc 78 upon which the flyweights of the governor bear, and a thrust bearing 79, resting on the disc, is engaged by a spring 80 compressed by an adjustable abutment 81, the spring counteracting the centrifugal displacement of the flyweights. Spring compression is controlled by a rack 82 secured to the abutment 81 moved up or down by a pinion 83 turned by a pulley 84 from which an adjusting cable 85 runs to a location convenient to the aircraft crew. The movement of the abutment is limited by stops 86. As spring compression is relieved, the flyweights move outwardly a greater distance at a given R. P. M., whereupon the valve stem 47 is lifted causing an increase in propeller pitch with reduction in R. P. M. Conversely, if spring compression be increased, engine R. P. M. is increased. If the spring compression be relieved to the limit, propeller pitch will continue to increase and will reach a full feathered condition so long as the engine is operating and oil pressure is available to operate the clutch 28, 30. Thereupon the engine may be stopped. Should the engine again be started while in flight, normal governor adjustment may be made whereupon forces on the propeller blades will move them from feathering to normal pitch.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In an aircraft power plant in combination, a geared engine having concentric high speed and low speed shafts, the latter being geared to and driven by the former, a controllable pitch propeller mounted on the low speed shaft, a high speed shaft extension extending through and beyond the propeller, and selectively operable friction clutch means carried by the propeller for connecting said extension to the controllable propeller blades to effect pitch changes thereof.

2. In an aircraft power plant in combination, an engine comprising a high speed crankshaft geared to and embraced by a concentric low speed propeller shaft, the propeller shaft being driven by the crankshaft, a propeller hub secured to said propeller shaft, blades journalled in said hub for pitch change, and a selectively operable friction driving connection from said crankshaft to said blades to effect pitch changes thereof.

3. In an aircraft power plant in combination, an engine comprising a high speed crankshaft geared to and embraced by a concentric low speed propeller shaft, the propeller shaft being driven by the crankshaft, a propeller hub secured to said propeller shaft, blades journalled in said hub for pitch change, a driving connection from said crankshaft to said blades to effect pitch changes thereof, and a selectively operable friction slip clutch in said driving connection.

4. In a controllable pitch propeller mounted on an engine, a propeller shaft having a hub thereon, the hub having blades journalled therein for pitch change, a speed reducer forward of and secured to the hub having an input shaft and an output shaft the latter in driving engagement with the blades, a high speed shaft embraced by and extending through the propeller shaft to the engine and extending through said speed reducer and carrying a clutch plate, a second clutch plate secured to said input shaft, and a hydraulic piston-cylinder unit forward of the speed reducer selectively operable to frictionally engage said plates.

5. In a controllable pitch propeller mounted on an engine, a propeller shaft having a hub thereon, the hub having blades journalled therein for pitch change, a speed reducer forward of and secured to the hub having an input shaft and an output shaft the latter in driving engagement with the blades, a high speed shaft embraced by and extending through the propeller shaft to the engine and extending through said speed reducer and carrying a clutch plate, a second clutch plate secured to said input shaft, a hydraulic piston-cylinder unit forward of the speed reducer selectively operable to frictionally engage said plates and means to circulate cooling fluid over said plates during propeller operation.

6. In a controllable pitch propeller, a hub having blades journalled therein for pitch change, a member with respect to which said hub is constantly rotatable during propeller operation, blade pitch changing mechanism, a slipping friction clutch connecting said mechanism with said member, and means to control the degree of clutch slip necessary to increase, decrease or maintain a desired blade pitch angle.

7. In a controllable pitch propeller, a hub having blades journalled therein for pitch change, a member with respect to which said hub is constantly rotatable during propeller operation, blade pitch changing mechanism, a slipping friction clutch connecting said mechanism with said member, means to control the degree of clutch slip necessary to increase, decrease or maintain a desired blade pitch angle, and means to cool said clutch during propeller operation.

8. In an aircraft engine comprising a crankshaft extending through a crankcase, a hollow propeller shaft embracing and piloted on the crankshaft, and reduction gearing driving the propeller shaft from the crankshaft and disposed within the crankcase; a propeller hub secured to the propeller shaft having blades mounted for pitch change, an extension shaft secured to the crankshaft and extending through the propeller shaft and forward thereof, clutch means ahead of the hub operable to connect the blades to the extension shaft to effect propeller blade pitch changes, and means passing through the hub for controlling clutch engagement.

EARL OLIVER SETTERBLADE.